(12) United States Patent
Beiderman et al.

(10) Patent No.: US 7,347,083 B2
(45) Date of Patent: Mar. 25, 2008

(54) SYSTEM AND METHOD FOR DETECTING A LEAK IN A HYDRAULIC FLUID SYSTEM

(75) Inventors: Allan R. Beiderman, Holmes, PA (US); Patrick J. Rexing, Morton, PA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 11/197,217

(22) Filed: Aug. 4, 2005

(65) Prior Publication Data

US 2007/0028674 A1 Feb. 8, 2007

(51) Int. Cl.
G01M 3/04 (2006.01)
G01M 19/00 (2006.01)
G01B 21/00 (2006.01)

(52) U.S. Cl. .................. 73/49.2; 340/605; 73/168

(58) Field of Classification Search ............... 73/40, 73/49.2, 40.5 R, 168; 340/605; 702/114
See application file for complete search history.

(56) References Cited

U.S. PATENT DOCUMENTS

| | | | |
|---|---|---|---|
| 5,402,110 A | 3/1995 | Oliver et al. ............... 340/605 |
| 5,497,653 A | 3/1996 | Snow ....................... 73/40.5 R |
| 5,548,278 A | 8/1996 | Oliver et al. ............... 340/605 |
| 5,673,025 A | 9/1997 | Refugio et al. ............. 340/605 |
| 5,703,569 A | 12/1997 | Oliver et al. ............... 340/605 |
| 5,744,701 A * | 4/1998 | Peterson et al. ............. 73/49.2 |
| 5,748,077 A | 5/1998 | Brandt ....................... 340/450 |
| 6,279,383 B1 | 8/2001 | Balke et al. .................... 73/40 |
| 6,696,960 B1 | 2/2004 | Martinez .................... 340/605 |
| 2004/0244480 A1 * | 12/2004 | Streetman ................. 73/290 V |

* cited by examiner

Primary Examiner—Hezron Williams
Assistant Examiner—Tamiko Bellamy
(74) Attorney, Agent, or Firm—Lee & Hayes, PLLC

(57) ABSTRACT

Methods, systems, and articles of manufacture consistent with the present invention provide for detecting a leak in a hydraulic fluid system having a reservoir and a conduit operatively connected to the reservoir. The fluid may reside in the reservoir, the conduit, or both. A current level of the fluid in the reservoir is sensed. A determination is made as to whether the current level is less than a leak detection level. When it is determined that the current level is greater than the leak detection level, a current temperature of the fluid is sensed and the leak detection level is updated based on the current temperature of the fluid so that thermal expansion of the fluid in the system is considered in detecting and isolating a leak.

26 Claims, 6 Drawing Sheets

SYSTEM AND METHOD FOR DETECTING A LEAK IN A HYDRAULIC FLUID SYSTEM

This application was made with Government support under contract number N00019-04-G-0007 awarded by the U.S. Navy. The government has certain rights in this invention.

BACKGROUND OF THE INVENTION

The present invention relates to systems for hydraulic leak detection, and, more particularly, to systems and methods for detecting a leak in a hydraulic fluid system by calculating a leak detection level of a reservoir based on a current temperature of the hydraulic fluid during operation of the system.

Vehicles (such as aircraft or automobiles) and machines (such as cranes or presses) using hydraulic systems to move or control objects often experience hydraulic fluid leaks in the lines, pumps, or actuators typically included in the hydraulic system. Conventional leak detection systems typically use fixed hydraulic reservoir levels as fault reaction levels to determine whether a leak has occurred and to isolate the leak. These fixed fault reaction levels are constant hard coded values in software used by the leak detection system. By using fixed fault reaction levels, conventional leak detection systems often allow excessive fluid to be lost before the system determines a fault reaction level has occurred (e.g., current reservoir level is below the fault reaction level) and a corresponding leak detected.

Certain conventional leak detection systems, such as the system on Boeing 777 aircraft, sense a temperature of the fluid in the reservoir during servicing of the hydraulic system. The sensed temperature is used to adjust an amount of fluid added to the reservoir by a technician to compensate for current environmental conditions that may cause fluid expansion or contraction in the reservoir. However, these conventional leak detection systems do not adjust the fixed fault reaction levels to compensate for fluid expansion due to temperature when detecting a leak in the hydraulic system, resulting in fluid loss where the fixed fault reaction levels are set too high.

Therefore, a need exists for systems and methods overcoming the problems noted above and others previously experienced for detecting a leak in a hydraulic fluid system.

SUMMARY OF THE INVENTION

In accordance with methods consistent with the present invention, a method for operating a hydraulic system in an aircraft is provided. The hydraulic system includes a reservoir, a conduit operatively connected to the reservoir, and fluid. The method comprises: setting a leak detection level to a value indicative of an initial level of the fluid in the reservoir and a thermal expansion capability of the fluid; sensing a temperature of the fluid when a current level of the fluid in the reservoir is less than the leak detection level; and updating the leak detection level based on the temperature of the fluid.

In accordance with methods consistent with the present invention, a method for detecting a leak in a hydraulic fluid system having a reservoir and a conduit operatively connected to the reservoir. At least one element of a group of elements consisting of the reservoir and the conduit contains a fluid. The method comprises: sensing a current level of the fluid in the reservoir; determining whether the current level is less than a first predetermined level (or leak detection level); when it is determined that the current level is greater than the leak detection level, sensing a current temperature of the fluid; and updating the leak detection level based on the current temperature of the fluid. The steps of this method may then be repeated using the updated leak detection level until a leak is detected.

In accordance with articles of manufacture consistent with the present invention, a computer-readable medium containing instructions for causing a control computer system having a program to perform a method for detecting a leak in a hydraulic fluid system is provided. The hydraulic fluid system includes a reservoir and a conduit operatively connected to the reservoir. At least one element of a group of elements consisting of the reservoir and the conduit contains a fluid. The hydraulic fluid system further includes a fluid level sensor and a temperature sensor. The fluid level sensor is operatively disposed in the reservoir and operatively controlled by the program. The temperature sensor is disposed in relation to the fluid and controlled by the program. The method comprises: sensing a current level of the fluid in the reservoir; determining whether the current level is less than a leak detection level; when it is determined that the current level is greater than the leak detection level, sensing a current temperature of the fluid; and updating the leak detection level based on the current temperature of the fluid.

In accordance with systems consistent with the present invention, a control computer system for detecting a leak in a hydraulic fluid system is provided. The hydraulic fluid system has a reservoir and a conduit operatively connected to the reservoir. At least one element of a group of elements consisting of the reservoir and the conduit contains a fluid. The hydraulic fluid system further includes a fluid level sensor disposed in the reservoir and a temperature sensor disposed in relation to the fluid. The control computer system is operatively connected to the fluid level sensor and the temperature sensor. The control computer system comprises: a memory having a program that senses a current level of the fluid in the reservoir; determines whether the current level is less than a leak detection level; when it is determined that the current level is greater than the leak detection level, senses a current temperature of the fluid; and updates the leak detection level based on the current temperature of the fluid. The control computer system further includes a processing unit that runs the program.

In accordance with systems consistent with the present invention, a system for detecting a leak in a hydraulic fluid system is provided. The hydraulic fluid system has a reservoir and a conduit operatively connected to the reservoir. At least one element of a group of elements consisting of the reservoir and the conduit contains a fluid. The system comprises: means for sensing a current level of the fluid in the reservoir; means for determining whether the current level is less than a leak detection level; when it is determined that the current level is greater than the leak detection level, means for sensing a current temperature of the fluid; and means for updating the leak detection level based on the current temperature of the fluid.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Reference will now be made in detail to an implementation in accordance with methods, systems, and products consistent with the present invention as illustrated in the accompanying drawings. The same reference numbers may be used throughout the drawings and the following description to refer to the same or like parts.

Figure 1:
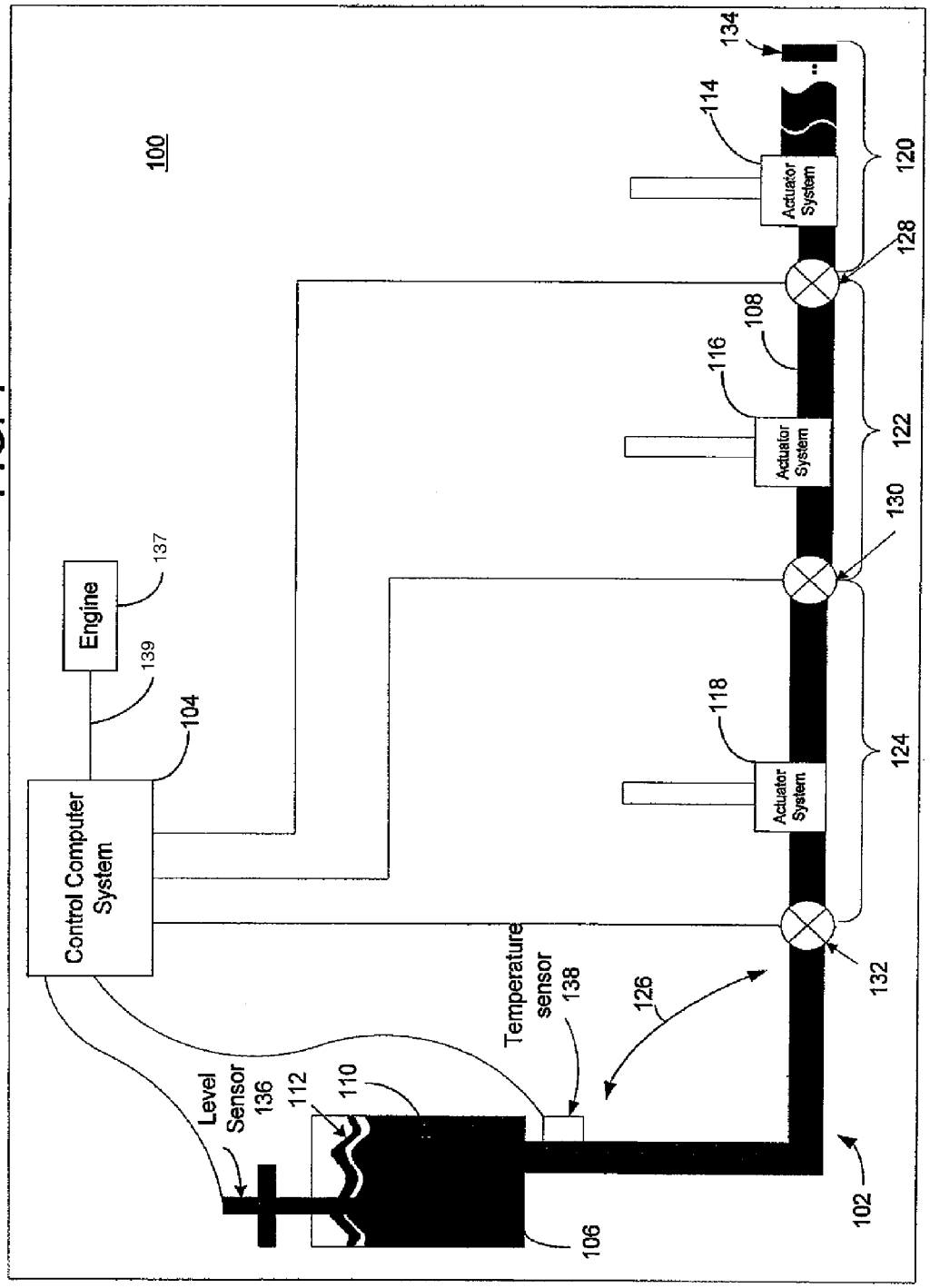
FIG. 1 depicts a block diagram of an exemplary system, such as an aircraft, employing a hydraulic fluid system and having a computer control system suitable for detecting a leak in the hydraulic fluid system consistent with the present invention.

FIG. 1 depicts a block diagram of an exemplary system 100 employing a hydraulic fluid system 102 and having a computer control system 104 suitable for detecting a leak in the hydraulic fluid system 102 consistent with the present invention. The system 100 may be a vehicle or machine (such as an aircraft, automobile, ship, crane, or press) that employs the hydraulic fluid system 102 to move or control an object or surface (not shown in the figures). The hydraulic fluid system 102 includes a reservoir 106, a conduit 108 operatively connected to the reservoir 106, and a hydraulic fluid 110 disposed within the reservoir 106 and the conduit 108 such that the fluid 110 occupies an initial volume or level 112 in the reservoir 106 before any loss of the fluid 110 via a leak in the hydraulic fluid system 102. In one implementation, the conduit 108 is connected at or near a bottom 107 of the reservoir 106 so that the fluid 110 flows from the reservoir to the conduit 108 by gravity. The fluid 110 may be Skydrol or another commercial or military grade hydraulic fluid. The conduit 108 may comprise flexible or rigid hydraulic hose lines and connectors.

The hydraulic fluid system 102 also includes one or more actuator systems 114, 116, and 118 operatively connected to the reservoir 106 via the conduit 108 such that fluid 110 within the conduit 108 may be selectively forced (by a pump not shown in the figures) into a respective actuator system 114, 116, or 118 to move or control a surface or object associated with the respective actuator system 114, 116, or 118. Each actuator system 114, 116, and 118 may have an exchange volume corresponding to a volume of fluid 110 used by the actuator system 114, 116, and 118 to move or control the surface or object associated with the respective actuator system 114, 116, or 118.

In one implementation, the conduit 108 has a plurality of zones 120, 122, 124, and 126 each of which includes one or more of the actuator systems 114, 116, and 118. In this implementation, the hydraulic fluid system 102 includes one or more valves 128, 130, and 132 operatively connected to the control computer system 104 so that each valve 128, 130 and 132 may be selectively opened or closed by the control computer system 104. Each valve 128, 130, and 132 operatively connects two of the zones 120, 122, 124, and 126 such that there is fluid communication from the reservoir 106 to an end 134 of the conduit 108 when each valve 128, 130, and 132 is opened. As discussed in further detail below, the control computer system is able to detect a leak in the hydraulic fluid system 102 and isolate the leak to one of the zones 120, 122, 124, or 126 by selectively closing at least one of the valves (e.g., valve 128) closet to the end 134 of the conduit 108.

The system 100 also includes a level sensor 136 disposed within the reservoir 106 and operatively connected to the control computer system 104 such that the control computer system 104 is able to sense a current volume or level of the fluid 110 in the reservoir 106. The system 100 further includes a temperature sensor 138 disposed within the reservoir 106 or the conduit 108 and operatively connected to the control computer system 104 such that the control computer system 104 is able to sense a current temperature of the fluid 110 in the reservoir 106 or the conduit 108.

The system 100 may also include an engine 137 or other device that is operatively configured to provide a signal 139 to the control computer system 104 indicating the system 100 is operating. For example, the signal 139 may indicate that the engine 137 has started or the system 100 is moving (e.g., aircraft weight off wheels). In the implementation shown in FIG. 1, the hydraulic fluid system 102 is depicted in a nominal state in which the control computer system 104 has opened each of the valves 128, 130, and 132 allowing fluid 110 to flow from the reservoir 106 to the end 134 of the conduit 108 and the current level of the reservoir 106 sensed by the control computer system 104 corresponds to the initial volume or level 112 in the reservoir 106.

Figure 2:
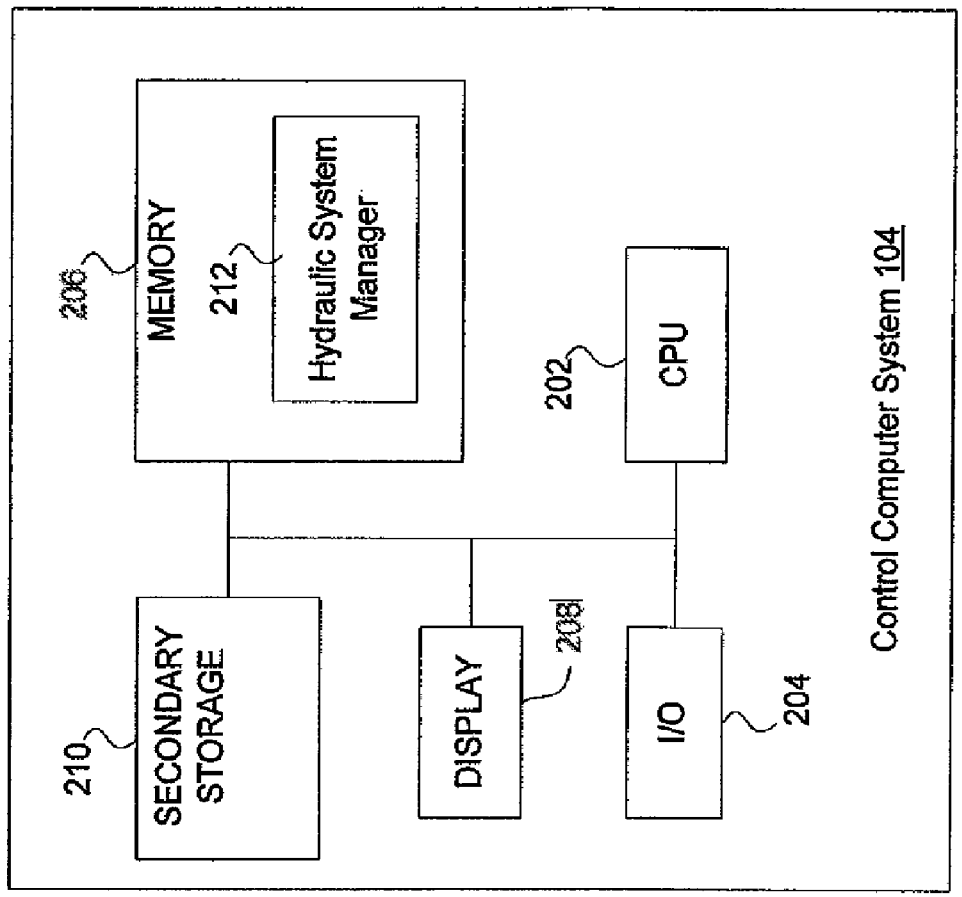
FIG. 2 depicts a block diagram of the computer control system in FIG. 1.

As shown in FIG. 2, the control computer system 104 comprises a central processing unit (CPU) 202, an input/output (I/O) unit 204, and a memory 206 operatively connected to the CPU. The I/O unit 204 operatively connects the CPU to the valves 128, 130, and 132, to the level sensor 136, and to the temperature sensor 138. Memory 206 includes a hydraulic system manager 212 program that is operatively configured to detect and isolate a leak in the hydraulic fluid system 102 as further discussed below. The control computer system may also include a display device 208, a secondary storage device 210, and standard input devices such as a keyboard, a mouse or a speech processing means (each not illustrated). The secondary storage device 210 may be a memory stick, removable hard drive, or other non-volatile memory storage device in which parameters 214, 216, 218, 220, and 222 of the hydraulic fluid system 102 may be stored for access by the hydraulic system manager 212. Alternatively, the parameters 214, 216, 218, 220, and 222 may be stored in memory 206. A first parameter (e.g., parameter 214) identifies a line volume of the hydraulic fluid system 102, where the line volume corresponds to a combined fluid 110 capacity or volume limit for a group of elements of the system 102 other than the reservoir 106, for example, the conduit 108, the actuator systems 114, 116, and 118, and the valves 128, 130, and 132. A second parameter (e.g., parameter 216) identifies an expansion coefficient of the fluid 110, indicating how much the fluid 110 will expand or contract when the temperature of the fluid 110 is increased or decreased. A third parameter (e.g., parameter 218) identifies a total exchange volume, indicating the combined value of the exchange volume for each of the actuator systems 114, 116, and 118. Alternatively, the third parameter 218 may be an array that identifies each exchange volume for each of the actuator systems 114, 116, and 118 so that the hydraulic system manager 212 may determine the total exchange volume based on which actuator systems 114, 116, and 118 are associated with a zone that has not been isolated by the manager as discussed further below. A fourth parameter (e.g., parameter 220) identifies a default level associated with the hydraulic fluid system 102. The default level represents a fixed minimum volume or level of fluid 110 that may be sensed in the reservoir 106 before a leak is identified, where the minimum volume or level is calculated using a maximum temperature expansion or contraction derived from the physical configuration of the hydraulic fluid system 102. A fifth parameter (e.g., parameter 222) may identify a number of zones 120, 122, 124, and 146 associated with the conduit 108.

One of skill in the art will appreciate that each program and module described herein (e.g., hydraulic system manager 212) may comprise or may be included in one or more code sections containing instructions for performing their respective operations. While the programs and modules are described as being implemented as software, the present implementation may be implemented as a combination of hardware and software or hardware alone.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of system 100 have been described, one skilled in the art will appreciate that a data processing system (e.g., control computer system 104) suitable for use with methods, systems, and articles of manufacture consistent with the present invention may contain additional or different components.

Figure 3A:
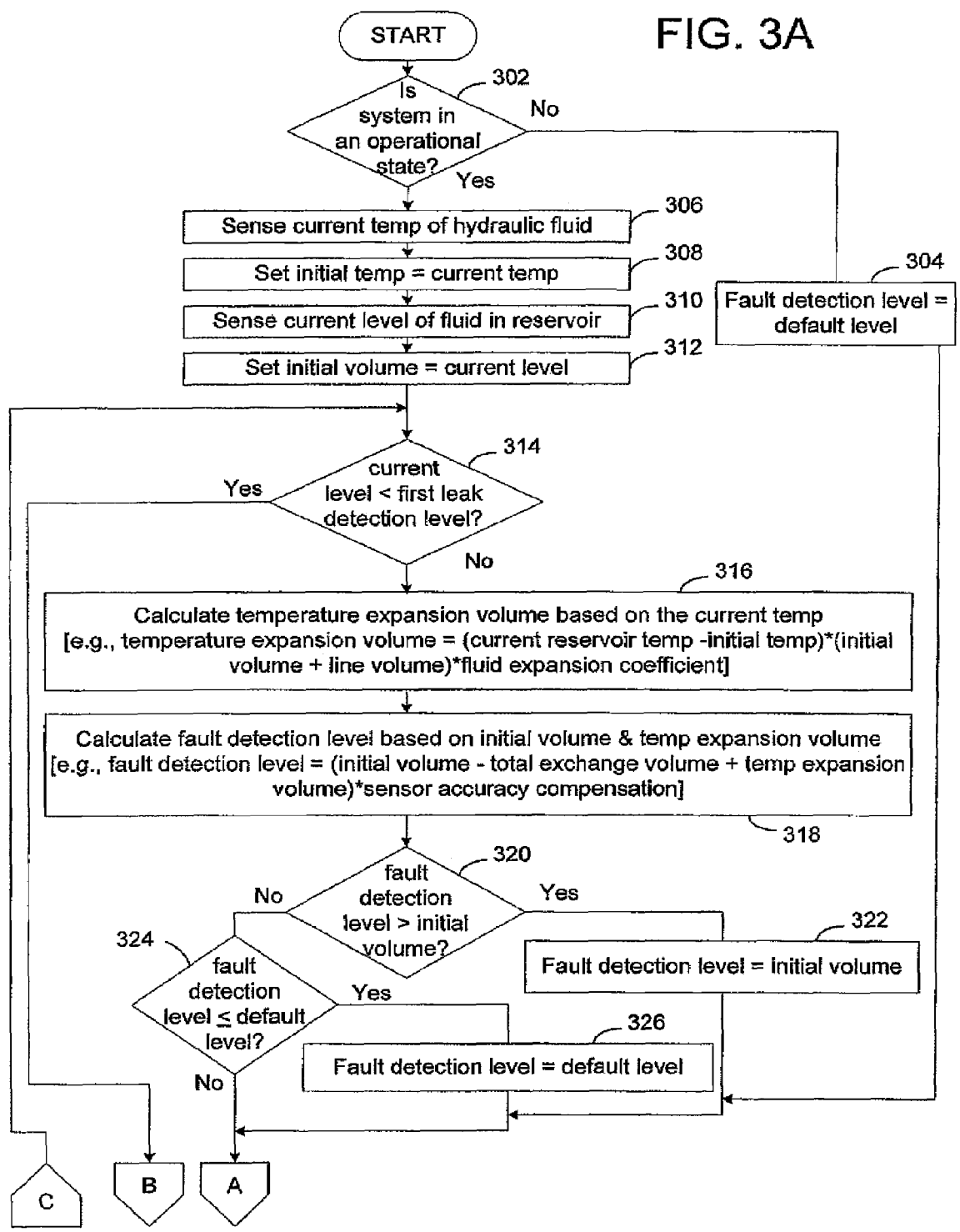
FIGS. 3A-3B depict a flow diagram illustrating a process performed by a hydraulic system manager in the computer control system to detect a leak in the hydraulic fluid system.
Figure 3B:
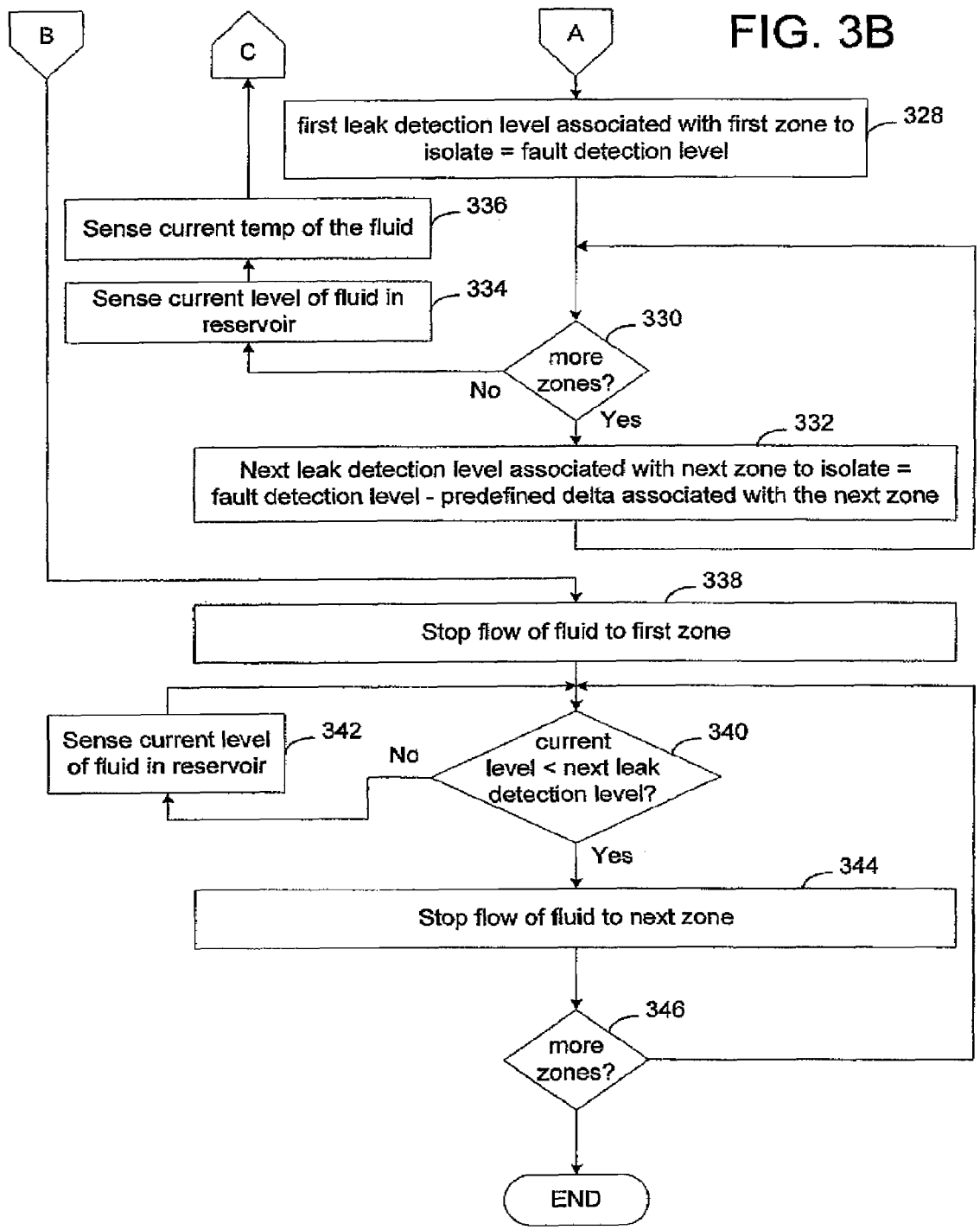

FIGS. 3A-3B depict a flow diagram illustrating a process performed by the hydraulic system manager 212 to detect a leak in the hydraulic fluid system 212 and to isolate the detected leak. Initially, the hydraulic system manager 212 determines whether the system 100 is in an operational state (step 302). In the implementation shown in FIG. 1, the hydraulic system manager 212 receives the signal 139 from the engine 137 to determine that the system 100 is in an operational state. However, the hydraulic system manager 212 may receive the signal 139 from another device of the system 100 (not shown in the figures) operatively configured to detect or latch an operating condition, such as an engine start or movement of the system 100. The hydraulic system manager 212 may also determine the system 100 is operating after determining that the level sensor 136 and the temperature sensor 138 are both operating within a respective predetermined tolerance.

If the system is not in an operational state, the hydraulic system manager 212 sets a fault detection level equal to the default level for the hydraulic fluid system 106 (step 304), for example, as identified by parameter 220 before continuing processing at step 328 discussed below. If the system is in an operational state, the hydraulic system manager 212 senses a current temperature of the hydraulic fluid 110 (step 306) via the temperature sensor 138, sets an initial temperature equal to the current temperature (step 308), senses a current level of the hydraulic fluid 110 in the reservoir 106 (step 310) via the level sensor 136, and sets an initial level equal to the current level (step 312).

Next, the hydraulic system manager 212 determines whether the current level is less than a leak detection level or first predetermined level (step 314). If the current level is less than the leak detection level, the hydraulic system manager 212 recognizes that a leak has been detected in the hydraulic fluid system 102 and proceeds to step 338 to continue processing. The leak detection level may initially be set equal to or greater than the default level of the reservoir such that the current level initially sensed by the hydraulic system manager 212 must be less than the default level for the hydraulic system manager 212 to recognize that a leak has been detected.

If the current level is not less than the leak detection level, the hydraulic system manager 212 calculates a temperature expansion volume of the fluid 110 based on the current temperature of the fluid 110 (step 316). In one implementation, when step 316 is performed two or more times, the temperature expansion volume is updated or recalculated based on a difference between the current temperature and the initial temperature, a combination of the initial volume or level 112 of the fluid 110 in the reservoir 106 and the line volume (e.g., parameter 214) of the hydraulic fluid system 102, and the expansion coefficient (e.g., parameter 216) of the hydraulic fluid system 102 as reflected in Equation (1).

$$\text{temperature expansion volume} = (\text{current temperature} - \text{initial temperature}) * (\text{initial volume} + \text{line volume}) * (\text{fluid expansion coefficient}) \quad (1)$$

Next, the hydraulic system manager 212 calculates a fault detection level based on the initial volume and the temperature expansion volume (step 318). In one implementation, when step 318 is performed two or more times, the fault detection level is recalculated based on the difference between the initial volume and the total exchange volume and the temperature expansion volume, which may be adjusted by a sensor accuracy compensation value (e.g., an error tolerance value) associated with the level sensor 136 as reflected in Equation (2).

$$\text{fault detection level} = (\text{initial volume} - \text{total exchange volume} + \text{temperature expansion volume}) * \text{sensor accuracy compensation} \quad (2)$$

After calculating the fault detection level, the hydraulic system manager 212 determines whether the fault detection level is greater than the initial volume of fluid 110 in the reservoir 106 (step 320). If the fault detection level is greater than the initial volume, the hydraulic system manager 212 sets the fault detection level equal to the initial volume (step 322).

If the fault detection level is not greater than the initial volume, the hydraulic system manager 212 determines whether the fault detection level is less than the default level (step 324). If the fault detection level is less than the default level, the hydraulic system manager 212 sets the fault detection level equal to the default level (step 326).

If the fault detection level is not greater than the initial volume and not less than the default level, the hydraulic system manager 212 sets the leak detection level associated with a first zone to isolate when a leak is detected to the fault detection level (step 328). Thus, the hydraulic system manager 212 prevents the leak detection level used to detect whether a leak has occurred from being greater than the initial volume of the fluid 110 in the reservoir 106 and from being less than the predetermined default level of the fluid 110 in the reservoir 106. In the implementation shown in FIG. 1, the first zone is the zone 120 located near the end 134 of the conduit 108 or farthest from the reservoir 106.

Next, the hydraulic system manager 212 determines whether there are more zones associated with the conduit (step 330). The hydraulic system manager 212 may be informed of the number of zones 120, 122, 124, and 126 via one of the parameters (e.g., parameter 222) of the hydraulic fluid system 102 stored in the secondary storage 210 or the memory 206. If there are more zones, the hydraulic system manager 212 then sets the next leak detection level associated with next zone to isolate when a leak is detected to the fault detection level (or the leak detection level) less a predefined factor associated with the next zone (step 332). For example, the predefined factor for the zone 122 second from the end 134 of the conduit 106 may be 25% of the leak detection level associated with the first zone 120, depending on the volume capacity of the first zone relative to the next zone 122 and the zones 124 and 126 between the next zone and the reservoir 106. The hydraulic system manager 212 may then continue processing at step 330 so that a respective next leak detection level is associated with each zone 120, 122, 124, and 126 of the conduit 108. Alternatively, the hydraulic system manager 212 may then continue processing at step 330 so that a respective next leak detection level is associated with each zone 120, 122, and 124 other than the zone 126 nearest the reservoir 106. As discussed further below, when a fault or leak is detected in the hydraulic fluid system 102 by the hydraulic system manager 212 (e.g., in step 314), the hydraulic system manager 212 uses the leak detection levels assigned to the zones 120, 122, and 124 to isolate the leak.

If there are more zones, the hydraulic system manager 212 again senses the current level of fluid 110 in the reservoir 106 (step 334) and senses the current temperature of fluid 110 (step 336) before continuing processing at step 314 to determine whether a leak has occurred based on the current level and the recalculated leak detection level. Thus, the hydraulic system manager 212 is operatively configured to vary the leak detection level based on the sensed current temperature of the fluid 110 in the reservoir 106 or conduit 108 to allow leak detection to vary in accordance with the temperature expansion characteristics of the fluid 110 in the hydraulic fluid system 102. For example, assuming the default volume is 80 cubic inches and the initial level is 150 cubic inches, the hydraulic system manager 212 may calculate the leak detection level to be in the range of 80 and 150 cubic inches depending on the current temperature of the fluid 110 during the operational state of the system 100.

Figure 4:
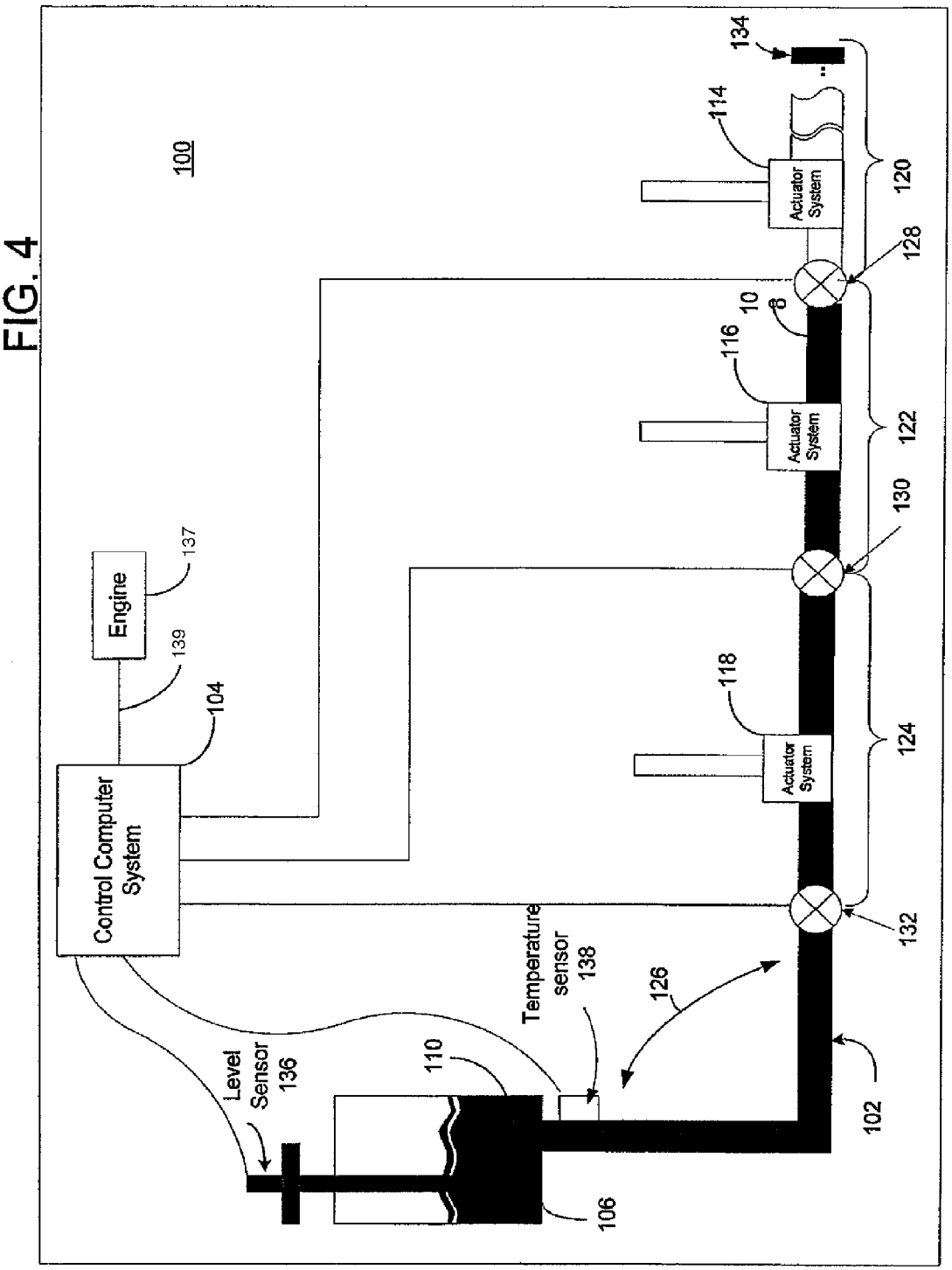
FIGS. 4-5 depict block diagrams of the system in FIG. 1 in which fluid is inhibited from flowing to respective zones of a conduit of the hydraulic fluid system by the hydraulic system manager to isolate a detected leak in accordance with the present invention.

If the current level is less than the leak detection level, the hydraulic system manager 212 recognizes that a leak has been detected in the hydraulic fluid system 102 and stops the flow of fluid to the first zone associated with the leak detection level (step 338) by closing one of the valves 128, 130, and 132 connecting the first zone 120 to other zones 122, 124, and 126 yet to be isolated. FIG. 4 depicts a block diagram of the system 100 in which the fluid 110 has been inhibited from flowing to the first zone 112 of the conduit 106 by the hydraulic system manager 212 to isolate the detected leak in accordance with the present invention.

Returning to FIG. 3B, the hydraulic system manager 212 then determines whether the current level of the fluid 110 in the reservoir 106 is less than the next leak detection level associated with the next zone (step 340). In the implementation shown in FIG. 4, once a leak has been detected by the hydraulic system manager 212 and the first zone 120 has been isolated by stopping the flow to the first zone 120, the hydraulic system manager 212 compares the current level of the fluid 110 in the reservoir 106 to the next leak detection level associated with the next zone 122 upstream from the first zone 120.

If the current level of the fluid 110 in the reservoir 106 is not less than the next leak detection level associated with the next zone, then the hydraulic system manager 212 recognizes that the leak has been isolated upstream from the next zone (e.g., zone 122) and senses current level of fluid in reservoir (step 342) before continuing processing at stop 340 to detect whether another leak has occurred within or upstream from the next zone. The hydraulic system manager 212 may also end processing at any time when it is determined that the system 100 in no longer operating.

Figure 5:
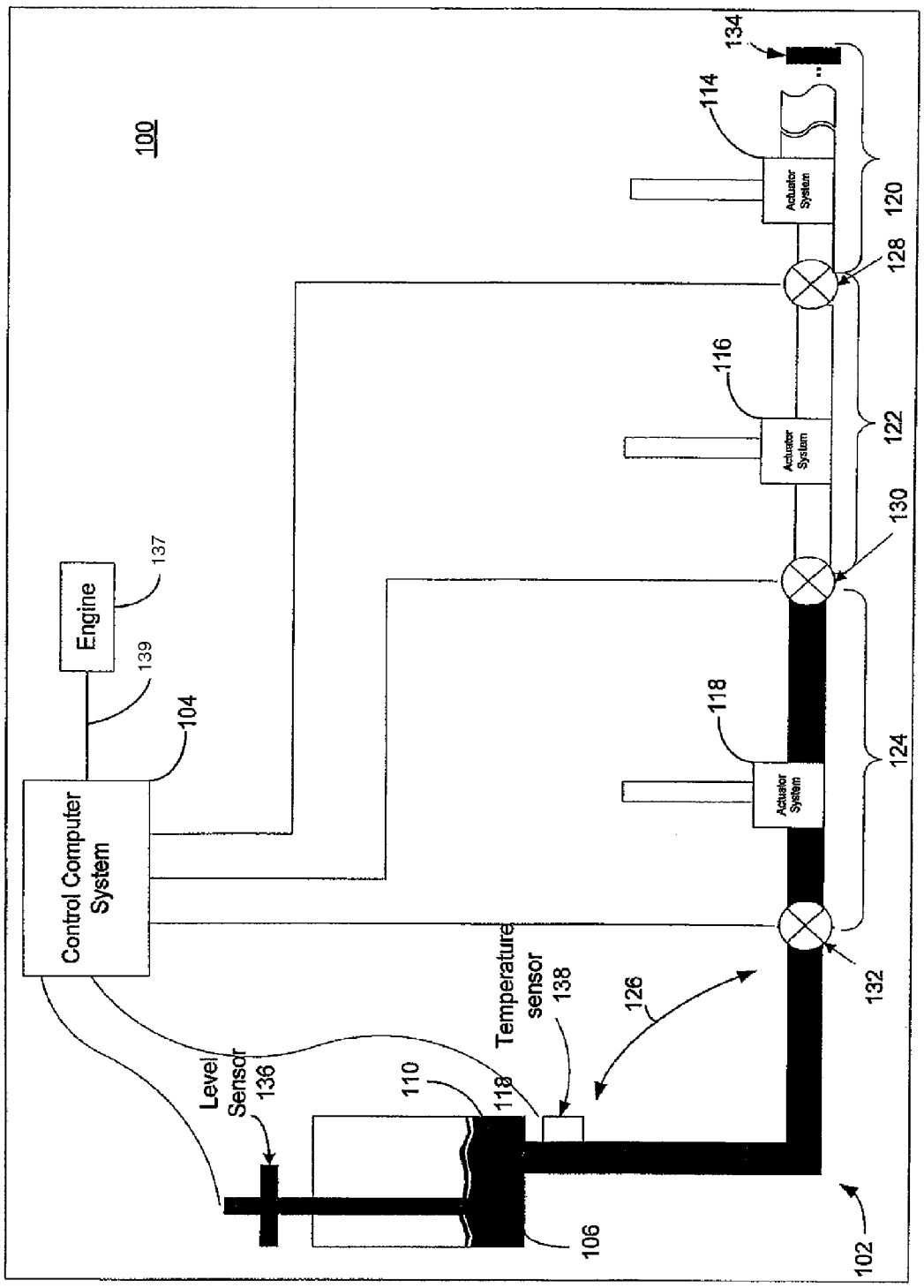

If the current level of the fluid 110 in the reservoir 106 is less than the next leak detection level associated with the next zone, the hydraulic system manager 212 stops the flow of fluid 110 to the next zone (step 344) and determines whether there are more zones to isolate (step 346) before continuing processing at step 340. Thus, the hydraulic system manager 212 is able to recognize whether the leak detected in accordance with step 314 was either not isolated in a zone upstream from the next zone (e.g., upstream from zone 122 in FIG. 4) or another leak has occurred within or downstream from the next zone (e.g., zone 122). Thus, in one implementation, the hydraulic system manager 212 continues processing at step 340 until the detected leak is isolated. In the example shown in FIGS. 4 and 5, the hydraulic system manager 212 determined that the current level was less than the leak detection level associated with the first zone 120 and isolated the first zone 120 in FIG. 4, the current level was less than the next leak detection level associated with the second zone 122 and isolated the second zone 122 in FIG. 5, and the current level was not less than the next leak detection level associated with the third zone 124. Thus, in this example, the hydraulic system manager 212 was able to isolate the leak to either the first zone 120 or the second zone 122 of the conduit 106.

Accordingly, the hydraulic system manager 212 is operatively configured to adjust or recalculate the leak detection level based on the current temperature of the fluid 110 during an operational state of the system 100 in order to account for temperature expansion volume of the fluid when detecting whether a leak has occurred in the hydraulic fluid system 102. The hydraulic system manager 212 is further operatively configured to isolate a detected leak based on the respective next leak detection level associated with each zone 122, 124, and 126 of the conduit 106 upstream from the first zone 120.

The foregoing description of an implementation of the invention has been presented for purposes of illustration and description. The description is not exhaustive and does not limit the invention to the precise form disclosed. Modifications and variations are possible in light of the above teachings or may be acquired from practicing the invention. For example, the described implementation includes software (e.g., hydraulic system manager program 212) but the present implementation may be implemented as a combination of hardware and software or hardware alone. Further, the illustrative processing steps performed by the program 212 can be executed in an order different than described above, and additional processing steps can be incorporated. The invention may be implemented with both object-oriented and non-object-oriented programming systems. The scope of the invention is defined by the claims and their equivalents.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of operating a hydraulic system in an aircraft, the hydraulic system including a reservoir, conduit operatively connected to the reservoir, and fluid, the method comprising:
   setting a leak detection level to a value indicative of an initial level of the fluid in the reservoir;
   sensing a current level of the fluid in the reservoir;
   comparing the current level with the leak detection level;
   if the current level is less than the leak detection level, isolating at least a portion of the conduit from the reservoir;
   if the current level is not less than the leak detection level:
      sensing a current temperature of the fluid;
      calculating a temperature expansion volume of the fluid based on the current temperature of the fluid;
      calculating a fault detection level based on the initial volume and the temperature expansion volume;
      if the fault detection level is not greater than the initial level or less than the default level, setting the leak detection level to a fault detection level;
      re-sensing the current level of the fluid in the reservoir; and
      re-comparing the current level with the leak detection level.

2. A method for detecting a leak in a hydraulic fluid system having a reservoir and a conduit operatively connected to the reservoir, at least one element of a group of elements consisting of the reservoir and the conduit containing a fluid, the method comprising:
   determining whether a system employing the hydraulic fluid system is operating;
   when it is determined that the system is operating,
      sensing an initial volume of the fluid before sensing a current level of the fluid in the reservoir;
      sensing an initial temperature of the fluid before sensing a current temperature;
      sensing the current level of the fluid;
      determining whether the current level is less than a leak detection level;
      when it is determined that the current level is greater than the leak detection level,
         sensing a the current temperature of the fluid; and
         updating the leak detection level based on a temperature expansion volume derived from the difference between the current temperature and the initial temperature and a combination of the initial volume and a line volume associated with the conduit.

3. A method as set forth in claim 2 wherein sensing a current level of the fluid; determining whether the current level is less than the leak detection level; when it is determined that the current level is greater than the leak detection level, sensing a current temperature of the fluid; and updating the leak detection level are each repeated until it is determined that the current level is less than the leak detection level.

4. A method as set forth in claim 2 wherein the combination of the initial volume and the line volume is multiplied by an expansion coefficient corresponding to the fluid.

5. A method as set forth in claim 2 wherein the leak detection level is calculated based on the initial volume plus the temperature expansion volume.

6. A method as set forth in claim 2 wherein the leak detection level is calculated to be in a range defined by the initial volume and a predetermined default level.

7. A method for detecting a leak in a hydraulic fluid system having a reservoir and a conduit with a plurality of zones operatively connected to the reservoir, at least one element of a group of elements consisting of the reservoir and the conduit containing a fluid, the method comprising:
   determining whether a system employing the hydraulic fluid system is operating;
   when it is determined that the system is operating, sensing an initial temperature;
   sensing a current level of the fluid in the reservoir;
   determining whether the current level is less than a leak detection level;
   when it is determined that the current level is greater than the leak detection level,
      sensing a current temperature of the fluid; and
      updating the leak detection level based on the difference between the current temperature and the initial temperature; and
   associating the leak detection level with a first of the zones, and inhibiting fluid flow to the first zone when it is determined that the current level is less than the leak detection level.

8. A method as set forth in claim 7 further comprising:
   when it determined that the current level is greater than the leak detection level, setting a next leak detection level associated with a next of the zones to the leak detection level less a predefined factor associated with the next zone.

9. A method as set forth in claim 8 further comprising:
   determining whether the current level is less than the next leak detection level; and
   inhibiting fluid flow to the next zone when it is determined that the current level is less than the leak detection level and less than the next leak detection level.

10. A computer-readable medium containing instructions for causing a control computer system having a program to perform a method for detecting a leak in a hydraulic fluid system including a reservoir and a conduit operatively connected to the reservoir, at least one element of a group of elements consisting of the reservoir and the conduit containing a fluid, the hydraulic fluid system further including a fluid level sensor and a temperature sensor, the fluid level sensor being operatively disposed in the reservoir and operatively controlled by the program, the temperature sensor disposed in relation to the fluid and controlled by the program, the method comprising:
   sensing an initial volume of the fluid in the reservoir;
   sensing an initial temperature of the fluid;
   after sensing the initial volume, sensing a current level of the fluid in the reservoir;
   determining whether the current level is less than a leak detection level;
   when it is determined that the current level is greater than the leak detection level, after sensing the initial temperature, sensing a current temperature of the fluid; and updating the leak detection level based on the current temperature of the fluid, wherein the leak detection level is calculated based on a temperature expansion volume derived from the initial volume and a difference between the current temperature and the initial temperature, the temperature expansion volume being further derived from a combination of the initial volume and a line volume associated with the conduit.

11. A computer-readable medium as set forth in claim 10 further comprising:

determining whether a system employing the hydraulic fluid system is operating; and wherein sensing the initial temperature of the fluid, and updating the leak detection level occur when it is determined that the system is operating.

12. A computer-readable medium as set forth in claim 11 wherein sensing a current level of the fluid; determining whether the current level is less than the leak detection level; when it is detemined that the current level is greater than the leak detection level, sensing a current temperature of the fluid; and updating the leak detection level are each repeated until it is determined that the current level is less than the leak detection level.

13. A computer-readable medium as set forth in claim 10 wherein the combination of the initial volume and the line volume is multiplied by an expansion coefficient corresponding to the fluid.

14. A computer-readable medium as set forth in claim 10 wherein the leak detection level is calculated based on the initial volume plus the temperature expansion volume.

15. A computer-readable medium as set forth in claim 10 wherein the leak detection level is calculated to be in a range defined by the initial volume and a predetermined default level.

16. A computer-readable medium as set forth in claim 10 wherein the conduit has a plurality of zones and the method further comprises associating the leak detection level with a first of the zones, and inhibiting fluid flow to the first zone when it is determined that the current level is less than the leak detection level.

17. A computer-readable medium as set forth in claim 16 further comprising:

when it determined that the current level is greater than the leak detection level, setting a next leak detection level associated with a next of the zones to the leak detection level less a predefined factor associated with the next zone.

18. A computer-readable medium as set forth in claim 17 further comprising:

determining whether the current level is less than the next leak detection level; and inhibiting fluid flow to the next zone when it is determined that the current level is less than the leak detection level and less than the next leak detection level.

19. A control computer system for detecting a leak in a hydraulic fluid system, the hydraulic fluid system having a reservoir and a conduit operatively connected to the reservoir, at least one element of a group of elements consisting of the reservoir and the conduit containing a fluid, the hydraulic fluid system further including a fluid level sensor disposed in the reservoir and a temperature sensor disposed in relation to the fluid, the control computer system being operatively connected to the fluid level sensor and the temperature sensor, the control computer system comprising:

a memory having a program that:
senses an initial volume of the fluid in the reservoir before sensing a current level of the fluid in the reservoir;
senses an initial temperature of the fluid before sensing a current temperature;
senses the current level of the fluid;
determines whether the current level is less than a leak detection level;
when it is determined that the current level is greater than the leak detection level,
senses the current temperature of the fluid; and
updates the leak detection level based on the current temperature of the fluid, wherein the leak detection level is calculated based on a temperature expansion volume derived from a difference between the current temperature and the initial temperature and a combination of the initial volume and a line volume associated with the conduit; and
a processing unit that runs the program.

20. A control computer system as set forth in claim 19 wherein the program further determines whether a system employing the hydraulic fluid system is operating; and when it is determined that the system is operating, senses an initial temperature of the fluid and updates the leak detection level based on a difference between the current temperature and the initial temperature.

21. A control computer system as set forth in claim 19 wherein the leak detection level is calculated based on the initial volume plus the temperature expansion volume.

22. A control computer system as set forth in claim 19 wherein the conduit has a plurality of zones, and the program further associates the leak detection level with a first of the zones and inhibits fluid flow to the first zone when it is determined that the current level is less than the leak detection level.

23. A control computer system as set forth in claim 22 wherein the program determines that the current level is greater than the leak detection level, the program further sets a next leak detection level associated with a next of the zones to the leak detection level less a predefined factor associated with the next zone.

24. A control computer system as set forth in claim 23 wherein the program further determines whether the current level is less than the next leak detection level, and inhibits fluid flow to the next zone when it is determined that the current level is less than the leak detection level and less than the next leak detection level.

25. A system for detecting a leak in a hydraulic fluid system having a reservoir and a conduit having a plurality of zones operatively connected to the reservoir, at least one element of a group of elements consisting of the reservoir and the conduit containing a fluid, the system comprising:

means for sensing a current level of the fluid in the reservoir;
means for determining whether the current level is less than a leak detection level;
when it is determined that the current level is greater than the leak detection level,
means for sensing a current temperature of the fluid;
means for updating the leak detection level based on the current temperature of the fluid; and means for associating the leak detection level with a first of the zones, and inhibiting fluid flow to the first zone when it is determined that the current level is less than the leak detection level.

26. A method as set forth in claim 1, further comprising:
if the fault detection level is greater than the initial level, setting the fault detection level equal to the initial level; and
if the fault detection level is less than a default level, setting the fault detection level to the default level.

* * * * *